United States Patent
Clower et al.

(10) Patent No.: US 7,529,710 B1
(45) Date of Patent: May 5, 2009

(54) MONITORING TRANSACTIONS BY NON-ACCOUNT HOLDER

(75) Inventors: Dyron Lee Clower, Euless, TX (US); John Wesley Templer, Jr., Fort Worth, TX (US); Jason Victor Griffin, Fort Worth, TX (US)

(73) Assignee: Valid Systems, Ft. Worth, TX (US)

( * ) Notice: Subject to any disclaimer, the term of this patent is extended or adjusted under 35 U.S.C. 154(b) by 838 days.

(21) Appl. No.: 10/864,513

(22) Filed: Jun. 10, 2004

(51) Int. Cl.
*G06Q 99/00* (2006.01)

(52) U.S. Cl. ...................................................... 705/39

(58) Field of Classification Search ............... 705/35–40
See application file for complete search history.

(56) References Cited

U.S. PATENT DOCUMENTS

| | | | |
|---|---|---|---|
| 5,910,988 A | 6/1999 | Ballard | |
| 6,032,137 A | 2/2000 | Ballard | |
| 6,045,039 A | 4/2000 | Stinson et al. | |
| 6,145,738 A | 11/2000 | Stinson et al. | |
| 6,149,056 A | 11/2000 | Stinson et al. | |
| 6,286,756 B1 | 9/2001 | Stinson et al. | |
| 6,328,207 B1 * | 12/2001 | Gregoire et al. | 235/379 |
| 6,695,204 B1 * | 2/2004 | Stinson et al. | 235/379 |
| 6,786,398 B1 | 9/2004 | Stinson et al. | |
| 6,856,965 B1 | 2/2005 | Stinson et al. | |

* cited by examiner

*Primary Examiner*—Thu-Thao Havan
*Assistant Examiner*—Thomas M Hammond, III
(74) *Attorney, Agent, or Firm*—Fish & Richardson P.C.

(57) ABSTRACT

Monitoring a non-account holder seeking to perform a transaction with a financial institution includes receiving first transaction information including an identity of a non-account holder and a disposition of a first transaction between a first financial institution and the non-account holder. The first transaction information is stored in a transaction history data store. A portion of the first transaction information in the transaction history data store is later accessed when determining whether to perform a subsequent transaction with the non-account holder.

42 Claims, 7 Drawing Sheets

MONITORING TRANSACTIONS BY NON-ACCOUNT HOLDER

TECHNICAL FIELD

This document relates to systems for monitoring non-account holders that seek to perform transactions with a financial institution.

BACKGROUND

A non-account holder is a person who seeks to perform a transaction (e.g., cashing a check) with a bank or other financial institution but does not have a banking relationship with the bank (e.g., does not have a bank account with the bank). Banks are highly susceptible to fraud at the hands of a non-account holder because of the difficulty in confirming the identity of the non-account holder and because of the lack of information regarding the history of transactions between the non-account holder and the bank and between the non-account holder and other banks.

DESCRIPTION OF DRAWINGS

Like reference symbols in the various drawings indicate like elements.

DETAILED DESCRIPTION

A system for identifying non-account holders and monitoring the transaction history of non-account holders enables banks to decrease incidences of fraud performed by non-account holders. The system enables banks to decrease identity fraud by providing a comprehensive non-account holder enrollment process that includes comparing collected identification data with identification data stored in third party, non-public, identity verification data stores. Once a non-account holder is enrolled, the system enables banks to decrease fraud by tracking the transactions between banks and enrolled non-account holders and enabling a bank to review the transaction history of an enrolled non-account holder when determining whether to perform a transaction with the enrolled non-account holder (e.g., when determining whether to allow the enrolled non-account holder to open an account with the bank or whether to grant a loan to the enrolled non-account holder).

The system also provides banks with a recommendation as to whether to perform a transaction (e.g., cash a check) with an enrolled non-account holder. The recommendation is generated through an automated risk analysis. The automated risk analysis is performed by accessing the transaction history of the enrolled non-account holder and applying a set of risk rules to the accessed transaction history. The result of the risk analysis is a transaction approval or denial recommendation. The bank may automatically perform the transaction in accordance with the recommendation (e.g., when the transaction is performed at an Automated Teller Machine (ATM)) or may ignore the recommendation and approve or deny the transaction based on other factors (e.g., when the transaction is performed at a teller terminal and a bank supervisor chooses to ignore the recommendation). The risk rules and thus the risk analysis may be tailored to each bank, thereby enabling each bank to vary the rules in accordance with its particular risk sensitivity.

Figure 1:
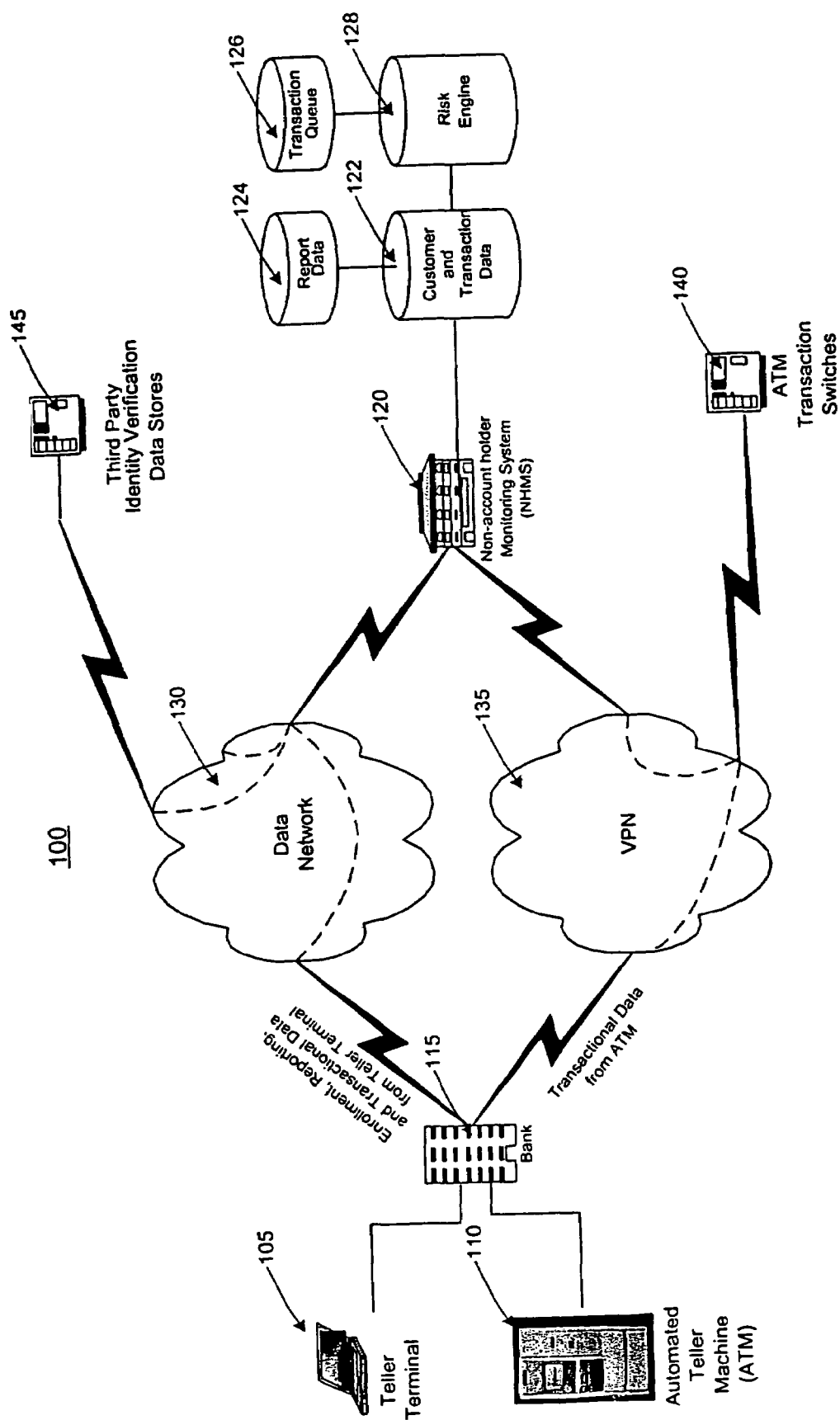
FIG. 1 is a block diagram of a system for identifying non-account holders and monitoring the transaction history of non-account holders.

Referring to FIG. 1, a system 100 for identifying non-account holders and monitoring the transaction history of non-account holders includes a teller terminal 105 and an ATM 110, both of which are associated with a bank 115. The teller terminal 105 communicates with a Non-account Holder Monitoring System (NHMS) 120 across a data network 130, and the ATM 110 communicates with the NHMS 120 across a virtual private network 135 through ATM transaction switches 140. The NHMS 120 provides non-account holder identity verification information to the teller terminal 105 by accessing third party identity verification data stores 145. While FIG. 1 only shows one bank 115, one or more other banks and associated teller terminals and ATMs also may communicate with the NHMS 120 to identify and track non-account holders.

The teller terminal 105 is a computer terminal configured to enable a teller affiliated with the bank 115 to verify the identity of a non-account holder and enroll the non-account holder into the NHMS 120. The teller terminal 105 also may be configured to process transactions with enrolled non-account holders and to generate management reports related to enrolled non-account holder transaction histories. The teller terminal 105 may include driver's license decoding software, a fingerprint scanner for biometric identification, and a check imaging device. In other implementations, the teller terminal 105 may use other types of biometric identification mechanisms. For example, the teller terminal 105 may include identification software that verifies the identity of a non-account holder based on an image of the non-account holder's face, a palmprint, DNA analysis, a retinal scan, or an analysis of the non-account holder's voice. In one implementation, the teller terminal 105 is a personal computer having peripheral components used to collect data from the non-account holder (e.g., a check imager, a card reader, and a fingerprint scanner) and with a secure connection to the NHMS 120 over the data network 130. The teller terminal 105 may additionally perform other financial service functions unrelated to non-account holder enrollment, tracking, and transaction processing. For example, the teller terminal 105 may enable the teller to assist account holders in withdrawing funds from and depositing finds to a savings and/or a checking account.

The teller terminal 105 is configured to enable a teller to enroll a non-account holder into the NHMS 120 by collecting data that identifies the non-account holder and communicating the collected data to the NHMS 120. For example, the teller terminal 105 may collect the identity data by swiping the non-account holder's driver's license, orally requesting the identity data from the non-account holder and manually entering the data, and/or enrolling a biometric template of the non-account holder (e.g., a template of the fingerprints of both index fingers of the non-account holder). The NHMS 120 uses some or all of the collected identity data to access identity verification data stored locally or stored in third party identity verification data stores 145. The NHMS 120 compares the accessed identity verification data to the collected identity data to validate the non-account holder's identity. If the identity of the non-account holder is successfully validated and the non-account holder was not previously enrolled, the NHMS 120 enrolls the non-account holder into the system.

The ATM 110 is a check cashing unit that is configured to enable an enrolled non-account holder to cash a check. In operation, an enrolled non-account holder enters his or her driver's license number, social security number (SSN), or other identification number, and the amount of the check to be cashed, and inserts the check into the machine. In some implementations, the enrolled non-account holder also may be required to provide biometric data. The ATM 110 may include biometric identification mechanisms similar to those included in the teller terminal 105. The ATM 110 also includes a check imaging device that produces images of the front and back of the check, validates the MICR ("magnetic ink character recognition") code on the check, and reads designated zones of the check. In one implementation, the ATM 110 is a Diebold Opteva 720 with an IDM operating on an Agilis 912 platform.

The ATM 110 is configured to send transactional data, including customer identity information (e.g., biometric data and identification number) to the ATM transaction switch 140, which converts the received transactional data into a format understandable by the NHMS 120 and sends the converted transactional data to the NHMS 120. The NHMS 120 determines whether to approve the transaction by accessing the transaction history of the enrolled non-account holder and performing a risk analysis in accordance with risk rules established and maintained for the particular bank 115 associated with the ATM 110. The NHMS 120 returns either an approval or denial indicator to the ATM 110. The ATM 110 proceeds to cash the check if an approval indicator was received or reject the check if a denial indicator was received.

The bank 115 may be any financial institution that provides check cashing services. The bank 115 also may enable customers to open bank accounts (e.g., checking or savings accounts) and may provide other types of financial services (e.g., loans). The bank 115 typically includes one or more teller terminals 105 and one or more ATMs 110. The teller terminals 105 and ATMS 110 may be local to the bank 115 or may be remote to the bank 115 but in communication with the bank 115 over a public or private data network.

The NHMS 120 includes a customer and transaction data store 122, a report data store 124, a transaction queue 126, and a risk engine 128. The customer and transaction data store 122 includes one or more records for each non-account holder. These records store non-account holder identity data, non-account holder transaction history data, and non-account holder enrollment history data. The non-account holder identity data includes identity data collected directly from the non-account holder and collected from the third party identity verification data stores 145. The non-account holder identity data may include some or all of the following items: name, address, date of birth, driver's license number, sex, height, eye color, hair color, weight, social security number or user identity (ID) number, phone number, previous five addresses (or any previous number of addresses), an indicator as to whether the non-account holder is deceased, and biometric data (e.g., fingerprint images).

The non-account holder transaction history data is collected by the NHMS 120 each time a transaction is completed with the non-account holder after the non-account holder has been enrolled. The transaction history data includes a transaction number, a transaction date and time, an ATM number if the transaction occurred at an ATM, an indicator that the transaction was handled automatically by an ATM or that the transaction was handled manually by an operator/teller, a log of supervisory overrides including the identity of the supervisor that submitted the override, and check information, if applicable. The check information may include the amount of the check, the payor identity (e.g., payor name, address, and/or phone number), whether the check was cashed, and the reason why the check was not cashed, if applicable. The transaction history data also includes a flag or setting that indicates whether the enrolled non-account holder has been placed on a negative or fraud list by a bank or by the NHMS 120 and also includes the identity of the bank, if applicable, that placed the non-account holder on the negative or fraud list.

The payor identity may be used to access payor records that are also stored in the customer and transaction history data store 122. The payor records may include the payor name, the payor address, the payor phone number (if applicable), the payor account number(s), and the payor transaction history. The payor transaction history may include the number of returned checks (i.e., "bounced" checks), the number of collected checks (i.e., "bounced" but then funded checks), dates when checks associated with the payor were cashed, and the identity of check payees.

The non-account holder enrollment history data is collected by the NHMS 120 each time an attempt to enroll a non-account holder is performed at the bank 115 and/or at other banks. If a non-account holder approaches the bank 115 or another bank to perform a transaction and the enrollment process (see FIG. 3) is started, a log of the enrollment is stored. The log includes time and date information when the enrollment process occurred, the name of the bank where the enrollment process was started, the name of the teller that performed the enrollment process, an indicator as to whether the enrollment was successful, and, if the enrollment was not successful, a reason why the enrollment was not successful. Reasons why an enrollment process may not be successful include that the non-account holder did not complete the enrollment process (e.g., the non-account holder walks away), that the non-account holder was recently enrolled at another bank (e.g., enrolled at another bank in the past week), that the non-account holder was placed on a fraud list or a negative list by another bank or by the NHMS 120, that the non-account holder did not correctly answer verification or confirmation questions (e.g., the non-account holder was not able to correctly identify his or her previous addresses), and that biometric authentication of the non-account holder failed. In one implementation, biometric authentication fails only if the non-account holder was previously enrolled in the system and the non-account holder was placed on a fraud list or a negative list.

Once a non-account holder has been successfully enrolled, the non-account holder may perform transactions (e.g., check cashing and opening a new account) with the bank. At the same time, the NHMS 120 begins tracking the transaction history of the enrolled non-account holder. In one implementation, a non-account holder only needs to enroll once with one bank in communication with the NHMS 120 to perform transactions with all banks in communication with the NHMS 120. In another implementation, a non-account holder must enroll separately with a bank in communication with the NHMS 120 before being allowed to perform transactions with that bank.

The report data store 124 is a data store configured to hold non-account holder identity data, transaction history data, and enrollment history data used to generate management reports for banks in communication with the NHMS 120. The data stored in the report data store 124 is typically a copy of all or some of the data stored in the customer and transaction history data store 122 and may be accessed and manipulated without the risk of changing or corrupting the original data stored in the customer and transaction history data store 122.

The NHMS 120 is configured to enable a bank 115 to validate the identity of a non-account holder by receiving non-account holder identity information from the teller terminal 105 and the ATM 110, and comparing the identity information to that stored in the customer and transaction data store 122 and/or in one or more third party identity verification data stores 145. The non-account holder identity information collected at the teller terminal 105 or at the ATM 110 may include, for example, an identification number, a phone number, biometric data, and/or information captured from a driver's license. The NHMS 120 may provide the bank with an indication that validation of the identity of the non-account holder has succeeded or, alternatively, with an indication that validation of the identity of the non-account holder has failed.

The NHMS 120 is also configured to monitor and track the transactions of enrolled non-account holders with the bank 115 and with other banks in communication with the NHMS 120. Specifically, the NHMS 120 is configured to receive enrolled non-account holder transaction request data from the teller terminal 105 and from the ATM 110. The enrolled non-account holder transaction request data includes an identifier of the enrolled non-account holder (e.g., the social security number of the non-account holder) and a transaction request. The transaction request is a request by the enrolled non-account holder to perform a transaction with the bank 115. For example, the transaction request may be a request received from the teller terminal 105 to open a new account with the bank 115 or a request received from the teller terminal 105 or from the ATM 110 to cash a check.

Once the ATM 110 or the teller terminal 105 disposes of a transaction request by either performing or not performing the requested transaction, the ATM 110 or the teller terminal 105 sends transaction disposition data to the NHMS 120. The transaction disposition data includes an identifier of the enrolled non-account holder and a transaction disposition. For example, the identifier may be the social security number of the enrolled non-account holder and the transaction disposition may indicate that the request to open a new account or to cash a check was denied and may provide information as to why the request was denied. The NHMS 120 uses the transaction disposition data to update the non-account holder's transaction history data that is stored in the customer and transaction data store 122.

The NHMS 120 may respond to a transaction request to open a new account by accessing the customer and transaction data store 122 and providing the teller terminal 105 with all or a portion of the transaction history of the enrolled non-account holder. By reviewing the transaction history of the enrolled non-account holder, the teller associated with the bank 115 may make an informed decision as to whether to allow the non-account holder to open a new account with the bank 115. For example, if the enrolled non-account holder has had a history of being denied check cashing services by the bank 115 or by other banks, the bank 115 may decide not to allow the enrolled non-account holder to open a new account.

The transaction history of the enrolled non-account holder that is displayed by the teller terminal 105 (through a user interface) may include the date, details, and disposition of previous transactions between the bank 115 and the enrolled non-account holder. For example, the transaction history may include the dates that check cashing services were requested by the enrolled non-account holder, the amounts of the checks, the name of the payor of each check, and whether the bank 115 approved or denied cashing each check.

The displayed transaction history of the enrolled non-account holder also may include information regarding transactions between the enrolled non-account holder and one or more other banks that also communicate with the NHMS 120. To preserve the privacy of the enrolled non-account holder and of the other banks, the displayed transaction history related to the other banks is typically provided anonymously (e.g., the identities of the other banks and the payor are not provided) and may be limited to transactions that reflect negative, delinquent, or fraudulent behavior by the enrolled non-account holder. For example, the displayed transaction history between the enrolled non-account holder and the other banks may include information related to the number and type of transaction requests denied by the other banks in a predetermined interval of time (e.g., in the last three months) but may not include the identity of the one or more other banks or the details of the specific transactions between the non-account holder and the other banks (e.g., the check amount, the date when the enrolled non-account holder requested to cash the check, and the identity of the payor). Additionally or alternatively, the displayed transaction history of the enrolled non-account holder with respect to other banks may be limited to an indication that the enrolled non-account holder was or was not placed on a black list or a fraud list by the NHMS 120 or by one or more of the other banks.

The NHMS 120 may respond to a transaction request to cash a check by accessing the transaction history of the non-account holder stored in the customer and transaction data store 122. The risk rules, which may be tailored specifically to the bank, are applied to the transaction history by the risk engine 128. The risk rules that are applied may vary by non-account holder identity and may take into account many factors in assessing the risk related to cashing a check with a particular non-account holder. The factors may include the amount of the check (e.g., if the check amount is greater than $500, do not cash the check), the frequency that the non-account holder requests check cashing services with the bank and/or with other banks (e.g., if the non-account holder has requested that the bank cash a check more than two times in a week, do not cash the check), and the payor transaction history (e.g., if more than 10% of the checks from that payor are returned, do not cash the check). After applying the risk rules, the risk engine 128 provides a recommendation that the bank cash the check or, alternatively, that the bank not cash the check. If the transaction with the enrolled non-account holder takes place at the teller terminal 105, the teller or a supervisor may choose to ignore the recommendation and instead cash or not cash the check, accordingly.

If the transaction with the enrolled non-account holder takes place at the ATM 110, the ATM 110 automatically cashes the check if the transaction request was approved. On the other hand, if the transaction request was not approved, the ATM 110 may inform the enrolled non-account holder that the check cannot be cashed and may instruct the enrolled non-account holder to contact a teller at the corresponding bank. Alternatively, the NHMS 120 may place the check cashing request in the transaction queue 126, and an operator of the NHMS 120 may be contacted to manually approve or deny the transaction. The operator may respond to the transaction request by taking actions that may include, among other actions, accepting the transaction, rejecting the transaction, or requesting identification of the user. The ATM 110 may be configured to enable communications between the operator and the enrolled non-account holder (e.g., the ATM 110 may include a telephone). The ATM 110 also may be configured to not cash checks of non-account holders that have not been enrolled in the NHMS 120 and instruct the non-account holders to contact a teller at the corresponding bank.

While the NHMS 120 is shown as a central processing system that provides non-account holder monitoring services for one or more banks, the functions performed by the NHMS 120 may be performed entirely by an internal system at a single bank or may be distributed across multiple internal systems at multiple different banks. Additionally, the functions of the NHMS 120 may be limited to tracking non-account holders and transactions with non-account holders that approach a single bank, rather than tracking non-account holders and their transactions when they approach any of multiple different banks.

The data network 130 is a delivery network that enables direct or indirect communications between the teller terminal 105, the NHMS 120, and the third party identity verification data stores 145, irrespective of physical separation. Examples of the data network 130 include the Internet, the World Wide Web, LANs, WANs, analog or digital wired and wireless telephone networks (e.g., PSTN, ISDN, and xDSL), radio, television, cable, satellite, and/or any other delivery mechanism for carrying data.

The ATM transaction switches 140 include an ATM transaction processor and an ATM terminal driver that enable exchange of transactional data between the ATM 110 and the NHMS 120 across the virtual private network 135. In one implementation, the ATM transaction switches 140 enable communications using the 912 messaging protocol.

The third party identity verification data stores 145 are data stores accessible to the NHMS 120 across the data network 130. The data stores 145 contain identity verification data that may be used to validate the identity of a non-account holder when the non-account holder enrolls into the NHMS 120. The identity verification data may include, but are not limited to, name, social security or other identification number, most recent five addresses, date of birth, driver's license number, sex, height, weight, eye color, hair color, phone number, whether the person is deceased, and aliases. The identity verification data is typically indexed by social security number and/or name. Some third party data stores 145 also may include biometric data (e.g., images of fingerprints). The third party identity verification data stores 145 may provide identity verification data not otherwise available to the public.

Figure 2:
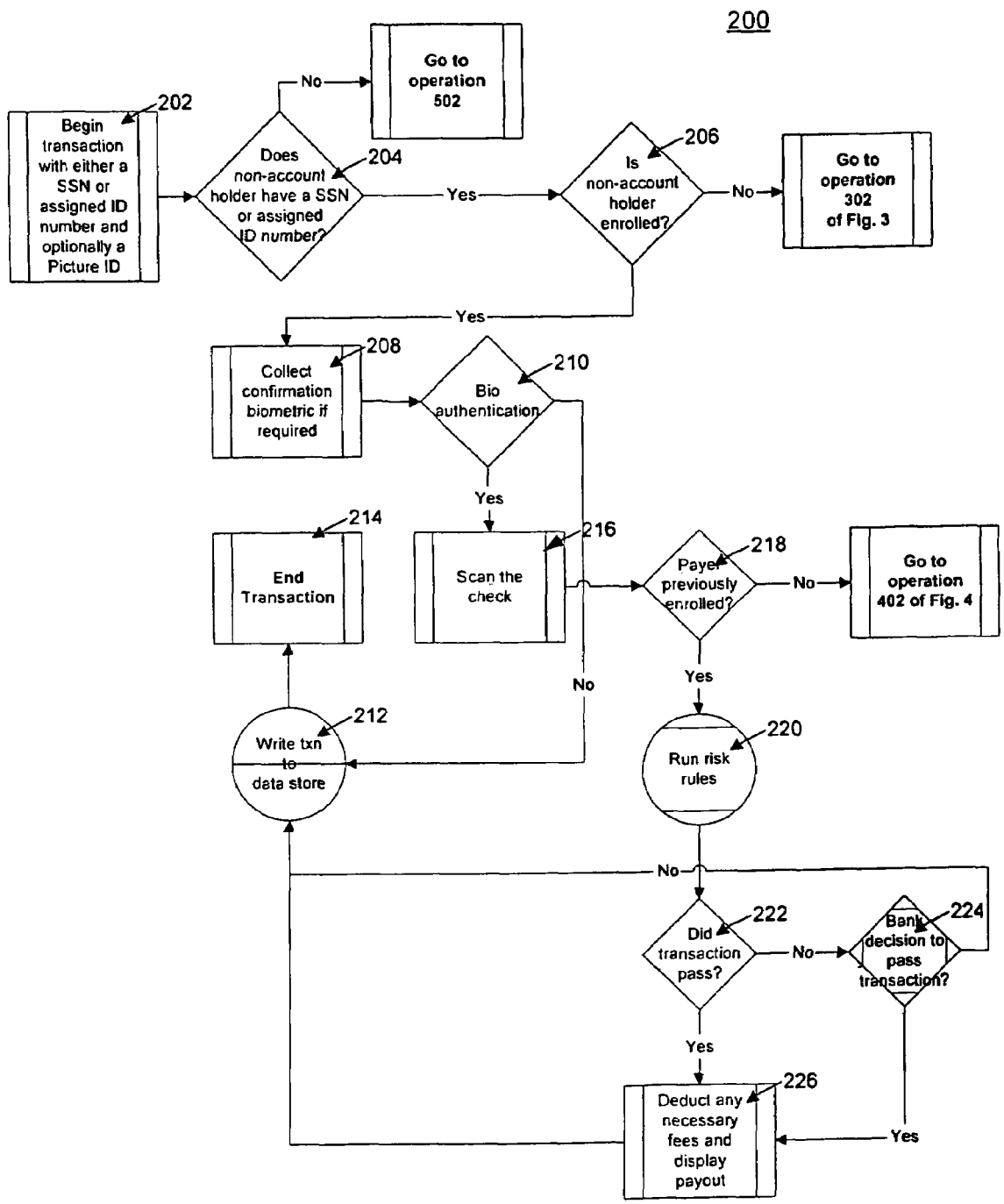
FIG. 2 is a flow chart illustrating a process for responding to a check cashing request from a non-account holder at a teller terminal.

FIG. 2 shows a transaction process 200 for responding to a check cashing request from a non-account holder at a teller terminal. For convenience, particular components described with respect to FIG. 1 are referenced as performing process 200. However, similar methodologies may be applied in other implementations where different components are used to define the structure of the system, or where the functionality is distributed differently among the components shown by FIG. 1.

When the non-account holder requests to cash a check, the teller asks the non-account holder to provide the following information: a social security number or an assigned ID number and, optionally, a picture identification (ID), such as a driver's license (202). If the non-account holder does not have a social security number or an assigned ID number (204), the transaction process 200 proceeds to an operation 502 of an ID assignment process 500 (show in FIG. 5 and discussed below) that randomly assigns a unique ID number to the non-account holder.

If the non-account holder has a social security number or an assigned ID number (204), the NHMS 120 accesses the customer and transaction data store 122 to determine whether the social security number or assigned ID number corresponds to a non-account holder enrolled with the bank 115 (206). For example, the NHMS 120 may determine whether a non-account holder record corresponding to the social security number or assigned ID number exists and, if the record does exist, may determine whether it indicates that the non-account holder is enrolled with the bank 115. If the record does not exist or if the record exists but the non-account holder is not enrolled with the bank 115, process 200 proceeds to operation 302 of a non-account holder enrollment process 300 (shown in FIG. 3 and discussed below).

Biometric data is then collected from the enrolled non-account holder (208). For example, the collection of biometric data may include collecting images of the fingerprints of the right and left index fingers of the enrolled non-account holder using the fingerprint scanner of the teller terminal 105. The NHMS 120 may then authenticate the identity of the enrolled non-account holder by comparing the collected biometric data with biometric data stored in the customer and transaction data store 122 and/or in the third party identity verification data stores 145 (210). If the bioauthentication is not successful, the NHMS 120 updates the corresponding non-account holder record with transaction disposition data to indicate that the check-cashing transaction was not successful due to the inability to confirm the identity of the enrolled non-account holder (212) and the transaction ends (214). If the bioauthentication is successful, the teller scans the check using the check imager of the teller terminal 105 (216).

A bank sometimes may not be able to perform bioauthentication due to an inability to capture biometric data from the non-account holder. For example, a person's fingerprints may be too worn to be detected by the fingerprint scanner. When bioauthentication is not possible, the bank may choose instead to ask the non-account holder a security question that was provided to the bank by the non-account holder when the non-account holder was enrolled in the NHMS 120. If the non-account holder does not correctly answer the security question, the NHMS 120 updates the corresponding non-account holder record with transaction disposition data to indicate that the check-cashing transaction was not successful due to the inability to confirm the identity of the enrolled non-account holder (212) and the transaction ends (214). If the non-account holder correctly answers the security question, the teller scans the check using the check imager of the teller terminal 105 (216). In some implementations, a bank may choose not to perform the bioauthentication and, instead, may choose to only use a picture ID to authenticate the identity of the non-account holder. The teller scans the check using the check imager of the teller terminal 105 (216) to obtain the following data: the payor account number, the routing number, the check number, the payor name, the payor address, and the payor phone (if applicable). The NHMS 120 accesses the payor records in the customer and transaction data store 122 to determine whether the payor name corresponds to an enrolled payor (218). For example, if the NHMS 120 is able to access a payor record corresponding to the payor's name, then the payor has already been enrolled in the NHMS 120. Otherwise, process 200 proceeds to operation 402 of a payor enrollment process 400 (shown in FIG. 4 and discussed below).

If the payor is enrolled, the NHMS 120 accesses the enrolled non-account holder transaction history in the corresponding non-account holder record in the customer and transaction data store 122, and the risk engine 128 applies the risk rules associated with the bank to the accessed transaction history to determine whether to pass or not pass the transaction (i.e., whether to recommend or not recommend that the bank cash the check of the enrolled non-account holder) (220). In another implementation, the NHMS 120 also accesses payor transaction history and/or the enrolled non-account holder enrollment history and applies the risk rules associated with the bank to both the accessed transaction history and either or both of the accessed enrollment history or payor transaction history to determine whether to pass the transaction.

If the transaction does not pass (222), the teller is informed that the transaction did not pass and is provided with a reason (e.g., the amount of the check exceeds a predetermined value set for that account holder) which may be communicated to the non-account holder. The teller and/or a supervisor of the bank may choose to override the decision of the risk engine 128 (224). If the teller and/or supervisor, chooses not to override the decision, the NHMS 120 updates the corresponding non-account holder record with transaction disposition data to include details of the check cashing transaction (e.g., check amount, date, and payor information) and indicate that the check-cashing transaction was not successful due to the reasons specified by the risk engine 128 (212), and the transaction ends (214).

If the transaction passes (222) or does not pass but the teller and/or supervisor chooses to allow the transaction (224), the teller terminal 105 deducts any necessary fees from the check amount and displays payout information to the teller (226). The teller then dispenses the funds to the enrolled non-account holder, the NHMS 120 updates the corresponding non-account holder record with transaction disposition data to include details of the check cashing transaction and to indicate that the check-cashing transaction was successful (212), and the transaction ends (214).

Figure 3:
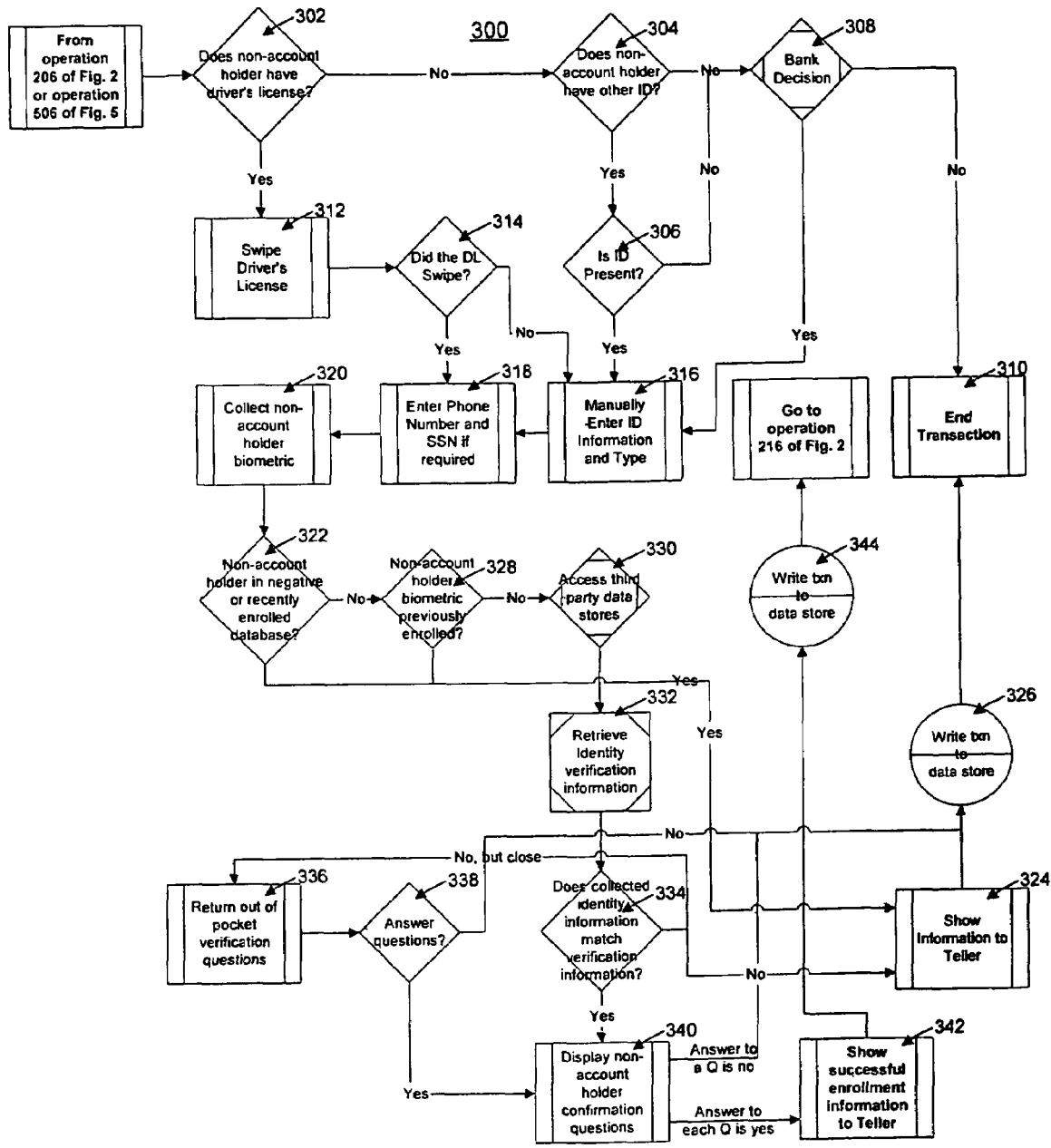
FIG. 3 is a flow chart illustrating a process for enrolling a non-account holder with a non-account holder monitoring system.

FIG. 3 shows a process 300 for enrolling a non-account holder with a non-account holder monitoring system. For convenience, particular components described with respect to FIG. 1 are referenced as performing process 300. However, similar methodologies may be applied in other implementations where different components are used to define the structure of the system, or where the functionality is distributed differently among the components shown by FIG. 1.

The teller requests a driver's license from the non-account holder (302). If the customer does not have a driver's license on his or her person, the teller requests another ID from the non-account holder (304). Examples of other IDs that a non-account holder may provide include a passport, a military ID, a work ID, and a credit card. If the non-account holder does not have a driver's license or other ID, or claims that he or she has a driver's license or other ID but does not have the driver's license or other ID on his or her person (306), the teller or the teller's supervisor may decide whether to continue the enrollment process (308). If the teller or the teller's supervisor decides not to continue the enrollment process, the enrollment process and the transaction end (310). In this case, the non-account holder is not enrolled, and the bank does not cash the check of the non-account holder.

If the customer has a driver's license, the teller swipes the driver's license using the card reader of the teller terminal 105 (312). Swiping the driver's license collects the following identity information: name, address, date of birth, driver's license number, sex, height, eye color, hair color, and weight. The identity information is flagged as having been collected from a driver's license. The card reader may or may not successfully read the data on the driver's license (314).

If the non-account holder has a driver's license that was not successfully read by the card reader, has another ID on his or her person, or does not have another ID but the teller or supervisor decides to go ahead with the enrollment process, the teller manually enters the identity information and the source of the identity information (316). The identity information may include some or all of the information available from the preferred ID and/or provided orally by the non-account holder and typically includes at least the name, address, sex, and date of birth of the non-account holder. The entered identity information is flagged to reflect the source of the identity information (e.g., received orally from the non-accountholder, received from a driver's license, received from a passport, and received from a credit card).

The teller also enters the phone number and, if an assigned ID number has not been generated, the social security or other identification number of the non-account holder (318). The teller then collects biometric data from the non-account holder (320). For example, the collection of biometric data may include collecting images of the fingerprints of the right and left index fingers of the enrolled non-account holder using the finger scanner of the teller terminal 105.

Once the non-account holder identification information, including biometric data, has been collected, the NHMS 120 accesses the customer and transaction data store 122 to determine whether the non-account holder has been placed on a negative/fraud list by the bank 115 or another bank, or has recently been enrolled at another bank (322). If the non-account holder has been placed on a negative/fraud list by the bank 115 or by another bank, the teller is informed that the non-account holder has been flagged as being a problem customer (324), the enrollment is denied, the enrollment denial is logged in the customer and transaction data store 122 (326), and the transaction ends (310). In this case, the non-account holder is not enrolled, and the bank does not cash the check of the non-account holder.

If the non-account holder has recently enrolled at another bank (e.g., has enrolled at another bank in the past week), the teller is informed that the non-account holder has recently enrolled at another bank (324), the enrollment is denied, the enrollment denial is logged in the customer and transaction data store 122 (326), and the transaction ends (310). The non-account holder is thereby prevented from cashing a check at bank 115. Non-account holders that have recently enrolled at another bank are not allowed to enroll again at bank 115 because of the increased risk of bank fraud posed by the non-account holder. Cashing fraudulent checks at multiple different banks in the same day or in a short interval of time is a common pattern among perpetrators of bank fraud. Preventing a non-account holder from enrolling at bank 115 if the non-account holder has recently enrolled at another bank helps prevents this type of bank fraud.

The NHMS 120 accesses the customer and transaction data store 122 to check whether the collected biometric data corresponds to another non-account holder that has already been enrolled (328). If the collected biometric data corresponds to another non-account holder that has already been enrolled, the teller is informed that the biometric data does not correspond to the identity offered by the non-account holder (324), the enrollment is denied, the enrollment denial is logged in the customer and transaction data store 122 (326), and the transaction ends (310).

If the non-account holder is not in a negative or fraud list, is not recently enrolled at another bank, and the collected biometric data does not correspond to an already enrolled non-account holder, the NHMS 120 accesses third party identity verification data stores 145 (330) to retrieve identity verification data corresponding to the non-account holder (332). Typically, the NHMS 120 is able to access the appropriate identity verification data using either the name or the social security or other identification number offered by the non-account holder.

The NHMS 120 validates the identity information collected from the non-account holder by comparing the collected information to the retrieved identity verification data (334). If the identity verification data does not match the identity information collected from the non-account holder, the teller is informed that the enrollment was not successful (324), the enrollment is denied, the enrollment denial is logged in the customer and transaction data store 122 (326), and the transaction ends (310).

If the identity verification data generally matches the identity information collected from the non-account holder with the exception that the collected identity information is different in minor ways (e.g., the driver's license number, phone number, or address is different), the teller may be provided with verification questions to ask the non-account holder (336). The verification questions may include, for example, a request that the non-account holder specify the last three residence addresses of the non-account holder. The teller asks the non-account holder the verification questions (338) and, if the non-account holder is not able to provide the correct answers to the teller's satisfaction, the enrollment is denied, the enrollment denial is logged in the customer and transaction data store 122 (326), and the transaction ends (310).

If the identity verification information completely matches the collected identity information, or if the non-account holder correctly answers the verification questions, the teller is provided with confirmation questions that the teller is required to answer (340). The confirmation questions are questions that relate to the physical appearance of the non-account holder such as, for example, "does the customer have blue eyes?" or "is the customer 6 foot 4 inches in height?" If the teller answers no to any of the confirmation questions, the enrollment is denied, the enrollment denial is logged in the customer and transaction data store 122 (326) and the transaction ends (310). If the teller answers yes to each confirmation question, the teller is informed that the enrollment was successful (342), the successful enrollment is logged in the customer and transaction data store 122 (344), and process 300 proceeds to operation 216 of transaction process 200 (FIG. 2).

Figure 4:
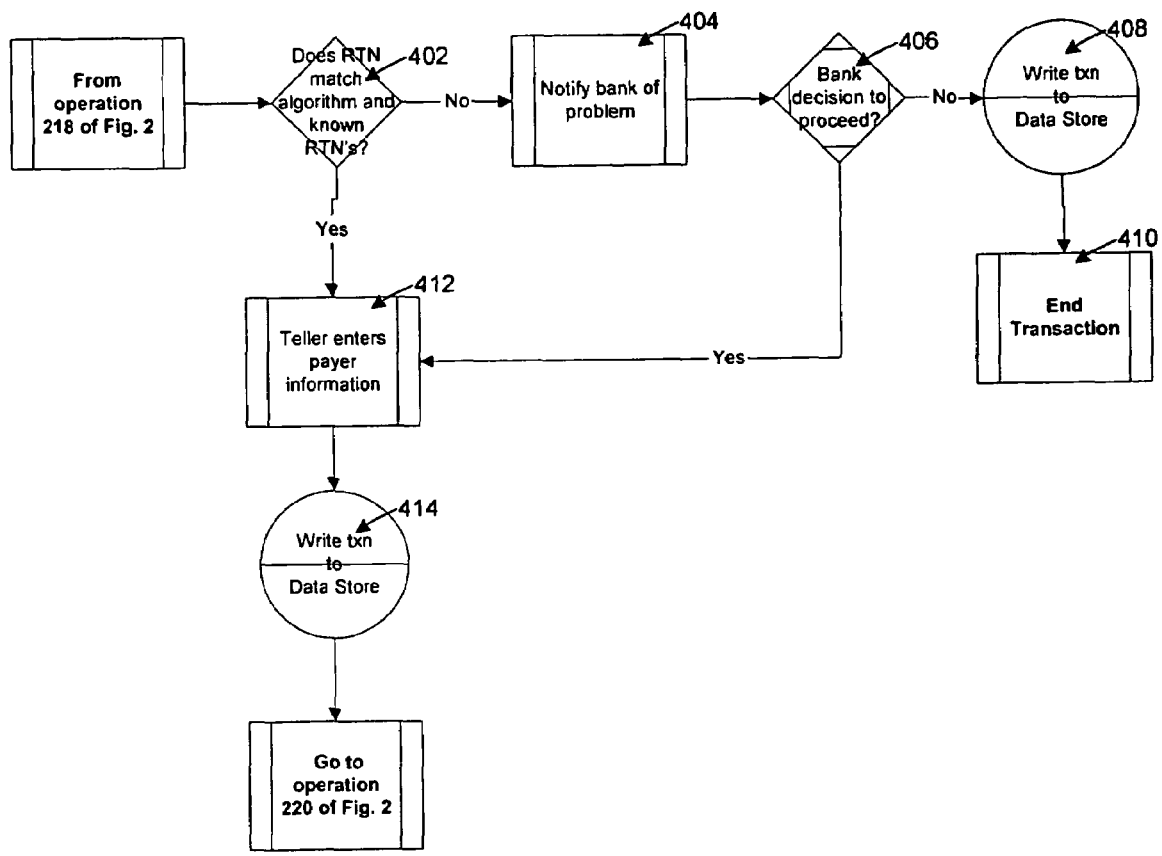
FIG. 4 is a flow chart illustrating a process for enrolling a payor with a non-account holder monitoring system.

FIG. 4 shows a process 400 for enrolling a payor with a non-account holder monitoring system. For convenience, particular components described with respect to FIG. 1 are referenced as performing process 400. However, similar methodologies may be applied in other implementations where different components are used to define the structure of the system, or where the functionality is distributed differently among the components shown by FIG. 1.

After the check routing number (RTN) is either manually entered by the teller at the teller terminal 105 or is scanned using the check imager, the NHMS 120 first verifies that the RTN is valid by running the RTN through a standard, well-known RTN algorithm, and then verifies that the RTN corresponds to a known bank (402). If the RTN is not valid or does not correspond to a known bank, the teller is informed of this (404) and the teller or a supervisor may decide whether to proceed with the payor enrollment (406). If the teller or supervisor decides not to proceed with the payor enrollment, the payor enrollment denial is logged in the customer and transaction data store 122 (408) and the transaction ends (410).

If the teller or supervisor decides to proceed with the payor enrollment despite an invalid or unknown RTN, or if the RTN is valid and corresponds to a known bank, the teller is prompted to enter the payor information (412). The payor information includes the payor name, address, account number, and phone number (if applicable). The NHMS 120 logs the payor enrollment and stores the payor information in a payor record in the customer and transaction data store 122 (414). Process 400 then proceeds to operation 220 of process 200 (FIG. 2).

Figure 5:
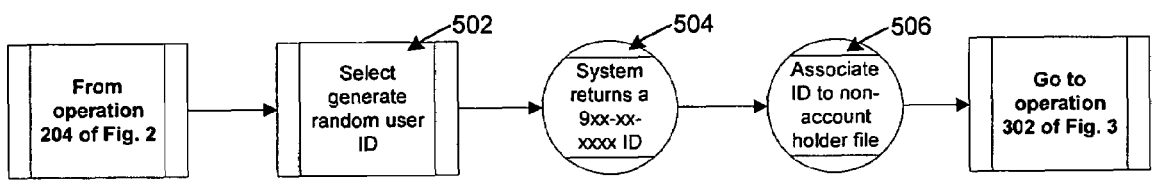
FIG. 5 is a flow chart illustrating a process for assigning a unique ID number to a non-account holder.

FIG. 5 shows a process 500 for assigning a unique ID number to a non-account holder. For convenience, particular components described with respect to FIG. 1 are referenced as performing process 500. However, similar methodologies may be applied in other implementations where different components are used to define the structure of the system, or where the functionality is distributed differently among the components shown by FIG. 1.

If the non-account holder does not have a social security number and is not enrolled in the NHMS 120, the teller may select to assign a unique ID number to the non-account holder (502). The NHMS 120 generates a unique ID number in response to a request by the teller (504). The unique ID number is subsequently used by the NHMS 120 to track all interactions with the non-accountholder. The unique ID number may be, for example, a randomly generated nine digit number similar to a social security number with the exception that the nine digit number begins with the number "9." Once a unique ID number has been generated, the NHMS 120 creates a non-account holder record that stores the generated ID number (506). As discussed previously, the enrollment history, the identity information, and the transaction history of the non-account holder are subsequently stored in the non-account holder record. After the unique ID number is generated and assigned to the non-account holder, process 500 proceeds to customer enrollment process 300 (FIG. 3).

Figure 6:
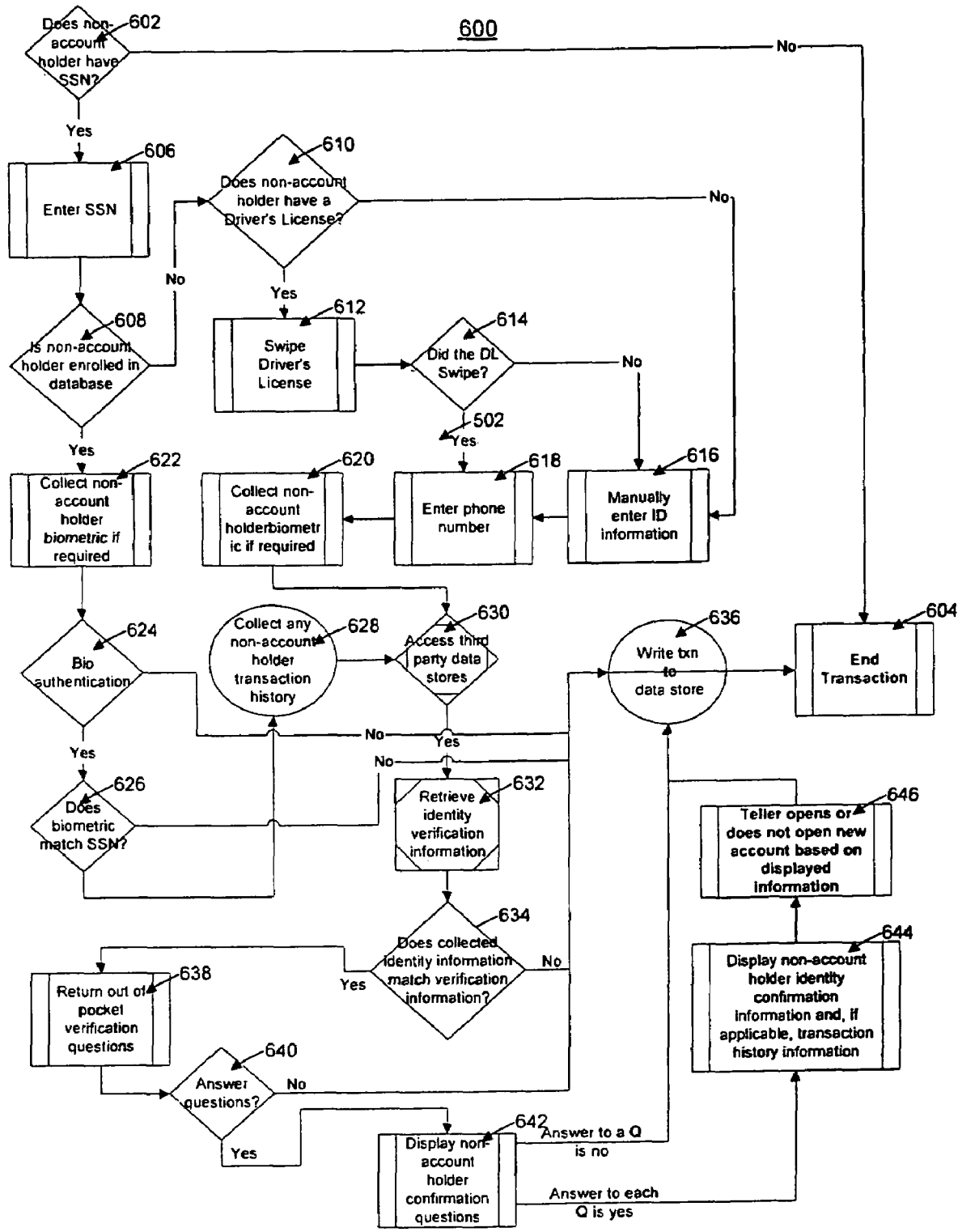
FIG. 6 is a flow chart illustrating a process for responding to a request from a non-account holder to open a new account at a teller terminal.

FIG. 6 shows a transaction process 600 for responding to a request from a non-account holder to open a new account at a teller terminal. For convenience, particular components described with respect to FIG. 1 are referenced as performing process 600. However, similar methodologies may be applied in other implementations where different components are used to define the structure of the system, or where the functionality is distributed differently among the components shown by FIG. 1. When the non-account holder requests to open a new account with the bank 115, the teller asks the non-account holder for his or her social security number (602). If the non-account holder does not have a social security number, the request to open a new account is denied and the transaction ends (604). If the non-account holder provides a social security number, the teller enters the social security number using the teller terminal 105 (606). In another implementation, if the non-account holder does not have a social security number, the bank does not deny the request to open a new account. Instead, the teller enters the name and/or address of the non-account holder using the teller terminal 105.

The NHMS 120 determines whether the non-account holder is enrolled by accessing the customer and transaction data store 122 using the entered social security number (608). In implementations in which the non-account holder does not have a social security number and the bank still proceeds with the transaction, the NHMS 120 determines whether the non-account holder is enrolled by accessing the customer and transaction data store 122 using the entered name and/or address. If the non-account holder is not enrolled, the teller asks the non-account holder for a driver's license (610). If the customer has a driver's license, the teller swipes the driver's license using the card reader of the teller terminal 105 (612). The card reader may or may not successfully read the data on the driver's license (614).

If the non-account holder has a driver's license that was not successfully read by the card reader or does not have a driver's license, the teller manually enters identity information (616). The identity information entered by the teller may be obtained from the driver's license of the non-account holder and/or from the non-account holder in response to teller questions. The information may include, for example, the name, address, driver's license number, date of birth, and sex of the non-account holder. The teller also enters the phone number of the non-account holder (618) and collects customer biometric data from the non-account holder (620). Some banks may not require that the teller collect customer biometric data from the non-account holder.

If the non-account holder is enrolled in the NHMS 120, the teller collects customer biometric data from the non-account holder (622). The NHMS 120 authenticates the identity of the enrolled non-account holder by comparing the collected biometric data with that stored in the customer and transaction data store 122 (624). If the bioauthentication is not successful, the NHMS 120 updates the corresponding non-account holder record (636) with transaction disposition data to indicate that the new account request was denied due to the inability to confirm the identity of the enrolled non-account holder. The transaction then ends (604). If the bioauthentication is successful, the NHMS 120 verifies that the identification number in the corresponding non-account holder record matches the identification number offered by the non-account holder requesting to open a new account (626). If the identification numbers do not match, the NHMS 120 updates the non-account holder record (636) with transaction disposition data to indicate that the new account request was denied due to the inability to confirm the identity of the enrolled non-accountholder. The transaction then ends (604). If the bioauthentication is successful and the identification numbers match, the NHMS 120 collects the non-account holder transaction history from the corresponding non-account holder record (628). Some banks may not require bioauthentication prior to collecting the enrolled non-account holder transaction history.

The NHMS 120 accesses third party identity verification data stores 145 (630) to retrieve identity verification data corresponding to the non-account holder (632). The NHMS 120 validates the identity information collected from the non-account holder by comparing the collected information to the retrieved identity verification data (634). If the identity verification data does not match the collected identification information, the NHMS 120 denies the new account request, logs the new account request denial (636) and ends the transaction (604). If the identity verification matches or generally matches the collected identification information, the teller is provided with verification questions to ask the non-account holder (638). The teller asks the non-account holder the verification questions (640), and if the non-account holder is not able to provide the correct answers to the teller's satisfaction, the new account request is denied, the new account request denial is logged in the customer and transaction data store 122 (636), and the transaction ends (604).

If the non-account holder correctly answers the verification questions, the teller is provided with confirmation questions that the teller is required to answer (642). If the teller answers no to any of the confirmation questions, the new account request is denied, the new account request denial is logged in the customer and transaction data store 122 (636), and the transaction ends (604). If the teller answers yes to each confirmation question, the NHMS 120 displays a confirmation of the non-account holder identity and, if applicable, displays the non-account holder transaction history (644). The teller then decides whether to open a new account for the non-account based on the displayed information (646). The new account request denial or approval is logged in the customer and transaction data store 122 (636), and the transaction ends (604).

While the transaction process 600 is directed to responding to a request from a non-account holder to open a new account, the same general process 600 may be used to respond to any transaction request from a non-account holder in which verification of the identity of the non-account holder is desirable. When generalizing process 600 to any transaction request, operation 646 is replaced by the teller deciding whether to perform the transaction based on the displayed information. An example of a transaction request that may be responded to through process 600 includes a request to grant a non-account holder a loan.

Figure 7:
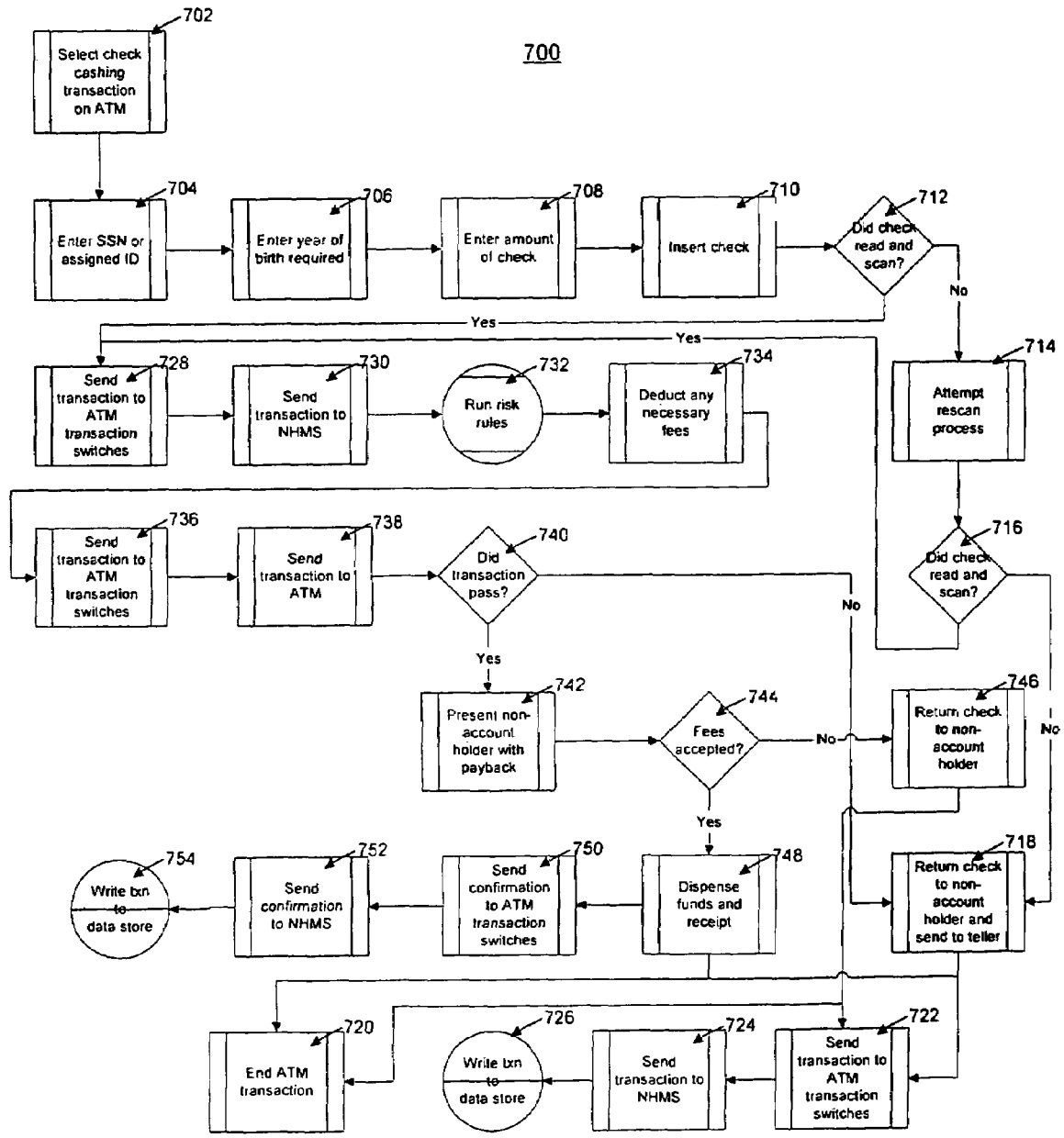
FIG. 7 is a flow chart illustrating a process for responding to a check cashing request from a non-account holder at an Automated Teller Machine (ATM).

FIG. 7 shows a transaction process 700 for responding to a check cashing request from a non-account holder at an ATM. For convenience, particular components described with respect to FIG. 1 are referenced as performing process 700. However, similar methodologies may be applied in other implementations where different components are used to define the structure of the system, or where the functionality is distributed differently among the components shown by FIG. 1.

The non-account holder selects to cash a check at the ATM 110 (702). The ATM 110 prompts the non-account holder to enter his or her social security number or assigned ID number (704), his or her date of birth (706), and the amount of the check (708). Some banks may not require that the non-account holder enter a date of birth.

In some implementations, the ATM 110 also may prompt the non-account holder to input a personal identification number (PIN) for security purposes (not shown). The PIN may be assigned to the non-account holder during the enrollment process. If the ATM 110 prompts the non-account holder to enter a PIN, the ATM 110 validates the identity of the non-account holder by sending the PIN and the identity information (e.g., SSN or assigned ID) to the NHMS 120 through the ATM transaction switches 140. The NHMS 120 accesses the non-account holder record corresponding to the received SSN or assigned ID number and determines whether the received PIN matches the assigned PIN stored in the record. The NHMS 120 then sends an identity validated signal (if the PINs match) or an identity not validated signal (if the PINs do not match) to the ATM 110 through the ATM transaction switches 140. If the identity is validated, the process 700 proceeds to operation 710. If the identity is not validated, the ATM 110 informs the non-account holder that the transaction has been rejected due to an inability to confirm the non-account holder's identity, and the transaction ends.

After the non-account holder has inputted identity information (and a valid PIN, if applicable), the ATM 110 prompts the non-account holder to insert the check into the ATM 110 (710). The ATM 110 proceeds to scan the check with the check imager (712). If the check is not successfully read by the scan, the ATM 110 attempts to rescan the check (714). If the rescan is not successful (716), the ATM 110 returns the check to the non-account holder and displays a message informing the non-account holder that the check cannot be read by the ATM and directing the non-account holder to visit a teller at the bank 115 (718). The ATM transaction with the non-account holder ends (720). The ATM sends transaction disposition data (e.g., the SSN, the date of birth, the amount of the check, and that the transaction failed due to the inability to read the check) to the ATM transaction switches 140 (722) which, in turn, send the transaction disposition data to the NHMS 120 (724). The NHMS 120 updates the customer and transaction data store 122 with the transaction disposition data (726).

If the check is read successfully by the scan or by the rescan, a check cashing transaction request is sent to the ATM transaction switches 140 (728). The ATM transaction switches process and send the check cashing request to the NHMS 120 (730). The NHMS 120 accesses the transaction history in the non-account holder record corresponding to the entered social security number or assigned ID and applies the risk rules associated with the bank 115 using the risk engine 128 (732). In some implementations, the NHMS 120 also accesses the enrollment history of the non-account holder and the check payor transaction history and applies the risk rules to the transaction history, enrollment history, and payor transaction history. If the check cashing transaction is approved after the risk analysis, the NHMS 120 also calculates and deducts any bank or transaction fees from the amount of the check (734).

The transaction recommendation generated by the risk analysis is sent by the NHMS 120 to the ATM transaction switches 140 (736), which process and send the transaction recommendation to the ATM 110 (738). The ATM 110 analyzes the transaction recommendation and determines whether the transaction passed the risk analysis (740). If the transaction did not pass the risk analysis, the ATM 110 returns the check to the non-account holder, informs the non-account holder that the check cannot be cashed, and instructs the non-account holder to visit a teller at the bank 115 (718). The ATM transaction ends (720) and the ATM sends transaction disposition data to the ATM transaction switches 740 (722), which process and send the transaction disposition data to the NHMS 120 (724). The NHMS 120 updates the non-account holder record in the customer and transaction data store 122 with the transaction disposition data (726).

If the transaction passed the risk analysis, the ATM 110 presents the non-account holder with payback information indicating the amount of money that the ATM will dispense if the customer chooses to accept the transaction (i.e., the amount of the check minus the calculated bank and transaction fees) (742). The non-account holder may then select whether or not to accept the transaction and corresponding transaction and bank fees (744). If the non-account holder does not accept the transaction, the check is returned to the non-account holder (746), and the ATM transaction ends (720). The ATM sends transaction disposition data indicating that the non-account holder rejected the transaction to the ATM transaction switches 740 (722), which process and send the transaction disposition data to the NHMS 120 (724). The NHMS 120 updates the non-account holder record in the customer and transaction data store 122 with the transaction disposition data (726).

If the non-account holder accepts the transaction, the ATM 110 dispenses the finds and a receipt (748) and sends transaction disposition data to the ATM transaction switches 140 indicating that the check was successfully cashed (750). The ATM transaction switches 140 process and send the transaction disposition data to the NHMS 120 (752). The NHMS 120 updates the non-account holder record in the customer and transaction data store 122 with the transaction disposition data (754).

Because process 700 records transaction disposition data in the corresponding non-account holder record, a teller is able to access the transaction disposition data to immediately tell a non-account holder when and why his or her check cashing transaction failed at the ATM 110. The teller enters the non-account holder identification number and, if available, scans the rejected check using the teller terminal 105. The teller terminal 105 accesses the transaction disposition data in the non-account holder record stored in the customer and transaction data store 122 and enables the teller to perceive the transaction disposition data. The teller may then provide immediate feedback to the non-account holder as to why the transaction failed. For example, the teller may inform the non-account holder that the check was not cashed due to the inability to scan the check because of a check jam, or that the check was rejected because of violation of a risk rule (e.g., the check amount exceeded the maximum amount allowed). The transaction disposition data also may inform the teller that the non-account holder was not provided with sufficient fun ds by the ATM 110 (i.e., the non-account holder was shorted). The teller may then dispense the additional funds owed to the non-account holder.

Other implementations are within the scope of the following claims.

What is claimed is:

1. A computer-implemented method of monitoring a non-account holder seeking to perform a transaction with a financial institution, wherein the non-account holder is an individual who does not have a banking relationship with the financial institution it is seeking a transaction with, the method comprising:

electronically receiving first transaction information related to one or more past transactions between a non-account holder and a first financial institution, the first transaction information including and a disposition of a first transaction between the first financial institution and the non-account holder;

electronically storing the first transaction information in a transaction history data store;

electronically receiving second transaction information related to one or more past transactions between the non-account holder and a second financial institution, the second transaction information including a disposition of a second transaction between the second financial institution and the non-account holder, the second financial institution being different from the first financial institution and the second transaction being different from the first transaction;

electronically storing the second transaction information in the transaction history data store;

electronically storing, in a risk engine data store, a first set of risk rules for the first financial institution, each rule in the first set of risk rules being a rule applicable to non-account holder transaction history data for determining whether to perform a requested transaction between the non-account holder and the first financial institution;

electronically storing, in the risk engine data store a second set of risk rules for the second financial institution, the second set of risk rules being different from the first set of risk rules, each rule in the second set of risk rules being a rule applicable to non-account holder transaction history data for determining whether to perform a requested transaction between the non-account holder and the second financial institution;

electronically receiving a request for approval of the subsequent transaction with either the first financial institution or the second financial institution;

electronically determining an identity of either the first financial institution or the second financial institution in response to the request;

electronically selecting the first set of risk rules from among multiple risk rule sets based on the determined identity of the first financial institution or electronically selecting the second set of risk rules from among the multiple risk rule sets based on the determined identity of the second financial institution;

electronically determining, within a computer processor, whether to perform the subsequent transaction between the non-account holder and either the first financial institution or the second financial institution by applying the first set of risk rules or the second set of risk rules, respectively, based on the determined identity of either the first financial institution or the second financial institution, to at least a portion of the first transaction information and to at least a portion of the second transaction information; and electronically communicating the subsequent transaction determination to either the first financial institution or the second financial institution.

2. The method of claim 1, further comprising electronically receiving identity information for the non-account holder that includes a social security number.

3. The method of claim 1, further comprising electronically receiving identity information for the non-account holder that includes a unique identity number.

4. The method of claim 1, further comprising electronically receiving identity information for the non-account holder that includes biometric data that identifies the non-account holder.

5. The method of claim 4, wherein the biometric data comprises image data of a fingerprint of the non-account holder.

6. The method of claim 1, further comprising validating the identity of the non-account holder prior to receiving the first transaction information.

7. The method of claim 6, wherein validating the identity of the non-account holder comprises comparing identity information collected from the non-account holder with information accessed from third party data stores.

8. The method of claim 7, wherein the information collected from the non-account holder and the accessed information include a social security number and information collected from a driver's license.

9. The method of claim 7, wherein the information collected from the non-account holder and the accessed information include biometric data.

10. The method of claim 9, wherein the biometric data comprise image data of a fingerprint of the non-account holder.

11. The method of claim 7, wherein validating the identity of the non-account holder includes a teller at the first financial institution asking the non-account holder to answer verification questions if the collected identity information does not match the accessed information.

12. The method of claim 11, wherein the verification questions include requesting one or more previous addresses associated with the non-account holder.

13. The method of claim 7, wherein validating the identity of the non-account holder includes a teller at the first financial institution answering confirmation questions if the collected identity information matches the accessed information.

14. The method of claim 13, wherein the confirmation questions include questions related to the physical attributes of the non-account holder.

15. The method of claim 1, wherein the first transaction comprises cashing a check and the disposition of the first transaction includes an approval indicator indicating that the check was cashed by the first financial institution or a denial indicator indicating that the check was not cashed by the first financial institution.

16. The method of claim 1, wherein the first transaction comprises opening an account and the disposition of the first transaction includes an approval indicator indicating that the account was opened by the first financial institution or a denial indicator indicating that the account was not opened by the first financial institution.

17. A computer-implemented method of determining whether to perform a check cashing transaction with a non-account holder seeking to perform the check cashing transaction with a bank, wherein the non-account holder is an individual who does not have a banking relationship with the bank, the method comprising:

electronically receiving, from a non-account holder, a request that a first bank cash a first check for the non-account holder, the request including an identity of the non-account holder;

electronically accessing, based on the identity of the non-account holder, transaction history information associated with the non-account holder from a data store, the transaction history information including a history of check cashing transactions between the non-account holder and the first bank and a history of check cashing transactions between the non-account holder and a second bank different from the first bank;

electronically receiving information extracted from the first check;

electronically determining an identity of the first bank;

electronically selecting, from among a plurality of different sets of risk rules, a first set of risk rules based on the determined identity of the first bank, the selected first set of risk rules being previously assigned to the first bank for processing of check cashing requests at the first bank and the plurality of different sets of risk rules including a second set of risk rules that is different from the first set of risk rules and that was previously assigned to the second bank for processing of check cashing requests at the second bank;

electronically performing a risk analysis by applying the selected first set of risk rules to the information extracted from the first check and to the transaction history information for the non-account holder, wherein each rule in the first set of risk rules is a rule applicable to non-account holder transaction history data for determining whether to perform a requested transaction between the non-account holder and the first bank, and wherein each rule in the second set of risk rules is a rule applicable to non-account holder transaction history data for determining whether to perform a requested transaction between the non-account holder and the second bank;

electronically determining whether to cash the first check based on the risk analysis; and electronically communicating to the first bank the determination whether to cash the first check.

18. The method of claim 17, wherein the transaction request is received from a teller terminal at the first bank.

19. The method of claim 17, wherein the transaction request is received from an Automated Teller Machine associated with the first bank.

20. The method of claim 17, wherein the transaction history information further includes a history of check cashing transactions between the non-account holder and one or more other banks.

21. The method of claim 17, wherein the transaction history information includes time, date, and transaction disposition information for check cashing transactions performed between the non-account holder and the first bank and for check cashing transactions performed between the non-account holder and the second bank.

22. The method of claim 17, wherein the transaction history information includes an indicator that indicates whether the non-account holder has been placed on a negative list by the first bank.

23. The method of claim 17, wherein determining whether to cash the first check based on the risk analysis comprises determining not to cash the first check if the transaction history indicates that the non-account holder has been placed on a negative list by the first bank.

24. The method of claim 17, wherein determining whether to cash the first check based on the risk analysis comprises determining not to cash the first check if the transaction history indicates that the non-account holder has recently performed a prior check cashing transaction with the first bank or with another bank.

25. The method of claim 17, wherein the first set of risk rules includes rules that place a limit on the amount of the check that can be cashed.

26. The method of claim 17, wherein the first set of risk rules includes rules that place a limit on the frequency of the non-account holder requesting check cashing services from the first bank or from other banks.

27. The method of claim 17, wherein the first set of risk rules are tailored to the first bank and the second set of risk rules are tailored to the second bank.

28. The method of claim 17, wherein the first set of risk rules vary based on the identity of the non-account holder.

29. The method of claim 17, wherein the transaction request is a request to open an account with the financial institution.

30. A system for monitoring a non-account holder seeking to perform a transaction with a financial institution, wherein the non-account holder is an individual who does not have a banking relationship with the financial institution it is seeking a transaction with, the system comprising:
  a data store configured to store non-account holder transaction history; and
  one or more computer processors configured to:
    receive first transaction information related to one or more past transactions between a non-account holder and a first financial institution, the first transaction information including and a disposition of a first transaction between the first financial institution and the non-account holder;
    store the first transaction information in a transaction history data store;
    receive second transaction information related to one or more past transactions between the non-account holder and a second financial institution, the second transaction information including a disposition of a second transaction between the second financial institution and the non-account holder, the second financial institution being different from the first financial institution and the second transaction being different from the first transaction;
    store the second transaction information in the transaction history data store;
    store a first set of risk rules for the first financial institution, each rule in the first set of risk rules being a rule applicable to non-account holder transaction history data for determining whether to perform a requested transaction between the non-account holder and the first financial institution;
    store a second set of risk rules for the second financial institution, the second set of risk rules being different from the first set of risk rules, each rule in the second set of risk rules being a rule applicable to non-account holder transaction history data for determining whether to perform a requested transaction between the non-account holder and the second financial institution;
    receive a request for approval of the subsequent transaction with either the first financial institution or the second financial institution;
    determine an identity of either the first financial institution or the second financial institution in response to the request;
    select the first set of risk rules from among multiple risk rule sets based on the determined identity of the first financial institution or select the second set of risk rules from among the multiple risk rule sets based on the determined identity of the second financial institution;
    determine whether to perform the subsequent transaction between the non-account holder and either the first financial institution or the second financial institution by applying the first set of risk rules or the second set of risk rules, respectively, based on the determined identity of either the first financial institution or the second financial institution, to at least a portion of the first transaction information and to at least a portion of the second transaction information; and
    electronically communicate the subsequent transaction determination to either the first financial institution or the second financial institution.

31. A system for determining whether to perform a transaction with a non-account holder seeking to perform the transaction with a bank wherein the non-account holder is an individual who does not have a banking relationship with the bank, the system comprising:
  a data store configured to store non-account holder transaction history; and
  one or more computer processors configured to:
    receive, from a non-account holder, a request that a first bank cash a first check for the non-account holder, the request including an identity of the non-account holder;
    access, based on the identity of the non-account holder, transaction history information associated with the non-account holder from a data store, the transaction history information including a history of check cashing transactions between the non-account holder and the first bank and a history of check cashing transactions between the non-account holder and a second bank different from the first bank;
    receive information extracted from the first check;
    determine an identity of the first bank;
    select, from among a plurality of different sets of risk rules, a first set of risk rules based on the determined identity of the first bank, the selected first set of risk rules being previously assigned to the first bank for processing of check cashing requests at the first bank and the plurality of different sets of risk rules including a second set of risk rules that is different from the first set of risk rules and that was previously assigned to the second bank for processing of check cashing requests at the second bank;

perform a risk analysis by applying the selected first set of risk rules to the information extracted from the first check and to the transaction history information for the non-account holder, wherein each rule in the first set of risk rules is a rule applicable to non-account holder transaction history data for determining whether to perform a requested transaction between the non-account holder and the first bank, and wherein each rule in the second set of risk rules is a rule applicable to non-account holder transaction history data for determining whether to perform a requested transaction between the non-account holder and the second bank;

determine whether to cash the first check based on the risk analysis; and electronically communicate to the first bank the determination whether to cash the first check.

32. The system of claim 31, wherein the one or more computer processors includes a risk engine that is configured to perform the risk analysis.

33. The method of claim 1, wherein the non-account holder is an individual that participated in the past transactions with the first financial institution without having a banking relationship with the first financial institution and that participated in the past transactions with the second financial institution without having a banking relationship with the second financial institution.

34. The method of claim 33,
wherein the past transactions between the non-account holder and the first financial institution comprise check cashing transactions,
wherein the first transaction comprises a check cashing transaction and the disposition of the first transaction includes an approval indicator indicating that the check was cashed by the first financial institution or a denial indicator indicating that the check was not cashed by the first financial institution,
wherein the past transactions between the non-account holder and the second financial institution comprise check cashing transactions, and
wherein the second transaction comprises a check cashing transaction and the disposition of the second transaction includes an approval indicator indicating that the check was cashed by the second financial institution or a denial indicator indicating that the check was not cashed by the second financial institution.

35. The method of claim 34,
wherein the subsequent transaction with the first financial institution and the subsequent transaction with the second financial institution are check cashing transactions,
wherein the first set of risk rules includes a rule that if the non-account holder has requested to cash a check more than a first predetermined number of times during a window of time, the subsequent transaction with the first financial institution is not allowed, and
wherein the second set of risk rules includes a rule that if the non-account holder has requested to cash a check more than a second predetermined number of times during the window of time, the subsequent transaction with the second financial institution is not allowed, the second predetermined number of times being different from the first predetermined number of times.

36. The method of claim 17,
wherein the history of check cashing transactions between the non-account holder and the first bank comprises a history of check cashing transactions with the first bank in which the non-account holder participated without having a banking relationship with the first bank, and
wherein the history of check cashing transactions between the non-account holder and the second bank comprises a history of check cashing transactions with the second bank in which the non-account holder participated without having a banking relationship with the second bank.

37. The method of claim 36,
wherein the first set of risk rules includes a rule that if the non-account holder has requested to cash a check more than a first predetermined number of times during a window of time, the check should not be cashed by the first bank, and
wherein the second set of risk rules includes a rule that if the non-account holder has requested to cash a check more than a second predetermined number of times during the window of time, the check should not be cashed by the second bank.

38. The method of claim 17, further comprising:
receiving, from the non-account holder, a request that the second bank cash a second check for the non-account holder, the request including the identity of the non-account holder;
accessing, based on the identity of the non-account holder, the transaction history information associated with the non-account holder from the data store;
receiving information extracted from the second check;
determining an identity of the second bank;
selecting, from among a plurality of different sets of risk rules, the second set of risk rules based on the determined identity of the second bank;
performing a second risk analysis by applying the selected second set of risk rules to the information extracted from the second check and to the transaction history information for the non-account holder; and
determining whether to cash the second check based on the second risk analysis.

39. The method of claim 1, wherein the first transaction information that is received further includes an identity of the non-account holder and the second transaction information that is received further includes the identity of the non-account holder.

40. The system of claim 30, wherein the first transaction information that is received by the one or more computer processors further includes an identity of the non-account holder and the second transaction information that is received by the one or more computer processors further includes the identity of the non-account holder.

41. The method of claim 1, wherein each of the multiple risk rule sets is assigned to a different financial institution.

42. The system of claim 30, wherein each of the multiple risk rule sets is assigned to a different financial institution.

* * * * *